United States Patent [19]
Tyra et al.

[11] Patent Number: 5,493,682
[45] Date of Patent: Feb. 20, 1996

[54] OBJECT BASED SYSTEM FOR SOFTWARE MAINTENANCE

[75] Inventors: Kristopher L. Tyra, Morrisville; Grant R. Gainey, Raleigh; David P. Zimmerman, Garner, all of N.C.

[73] Assignee: International Business Machines Corporation, Armonk, N.Y.

[21] Appl. No.: 329,792

[22] Filed: Oct. 26, 1994

Related U.S. Application Data

[63] Continuation of Ser. No. 100,583, Jul. 30, 1993, abandoned, which is a continuation of Ser. No. 644,804, Jan. 22, 1991, abandoned.

[51] Int. Cl.$^6$ .................................................. G06F 9/44
[52] U.S. Cl. ...................... 395/700; 364/280.2; 364/280
[58] Field of Search .................................. 395/650, 700

[56] References Cited

U.S. PATENT DOCUMENTS

| | | | |
|---|---|---|---|
| 4,330,822 | 5/1982 | Dodson | 364/200 |
| 4,558,413 | 12/1985 | Schmidt et al. | 364/200 |
| 4,809,170 | 2/1989 | Leblang et al. | 395/700 |
| 4,951,192 | 8/1990 | Chase, Jr. et al. | 395/700 |
| 4,953,080 | 8/1990 | Dysart et al. | 364/200 |
| 5,079,695 | 1/1992 | Dysart et al. | 395/700 |
| 5,084,813 | 1/1992 | Ono | 395/700 |
| 5,093,915 | 3/1992 | Platteter et al. | 395/700 |
| 5,130,924 | 7/1992 | Barker et al. | 364/419 |

OTHER PUBLICATIONS

Feldman, Stewart J., Software Practice and Experience, vol. 9(4), Apr. 1979, "Make–A Program for Maintaining Computer Programs".
A. Gustavsson, Proceedings of the 2nd Int. Workshop on Software Config. Management, Oct. 24, 1989, Princeton, New Jersey "Maintaining the Evolution of Software Objects in our Integrated Environment".
M. Marcus et al., IEEE Comp. Society 2nd Int. Conf. on ADA "DAPSE: Distributed ADA Programming Environment".
V. Ambriola et al., Proceedings of the 2nd Int. Workshop on Software Config. Management, Oct. 24, 1989, Princeton, New Jersey "Object Oriented Configuration Control".
E. A. Ballbergen et al., Proceedings of the 2nd Int. Workshop on Software Config. Management, Oct. 24, 1989, Princeton, New Jersey "On the Design of the Amoeba Config. Manager".

*Primary Examiner*—Kevin A. Kriess
*Attorney, Agent, or Firm*—William A. Kinnaman, Jr.

[57] ABSTRACT

A computer implemented system and method for automatically generating an executable version is based on component objects and events. Object-oriented language concepts of encapsulation, inheritance, and message passing are employed to simplify the specification and execution steps. Software maintenance includes the steps of assembling executable systems from defined component parts such as source code files and object code files. An object definition is provided for each software component containing a specification of its dependency upon other objects and processing methods that must be executed to create that object. An event definition is created for each process that is to be applied to the component objects. The event definition includes a specification of any prerequisite events and conditions for delivery of the event message. An object dependency interpreter is provided to recursively control the passing of events to the objects for action. It ensures that any prerequisite events are first executed and that any objects upon which the current object is dependent are processed before the present object. Inheritance is employed to simplify object definition through the definition of generic objects which the object dependency interpreter instantiates for processing. Mapped memory is used to store an object data structure containing the representation of component objects and event objects. Additional storage is used to retain component object file system status.

21 Claims, 2 Drawing Sheets

OBJECT BASED SYSTEM FOR SOFTWARE MAINTENANCE

This application is a continuation of application Ser. No. 08/100,583, filed Jul. 30, 1993, abandoned, which is a continuation of application Ser. No. 07/644,804, filed Jan. 22, 1991, now abandoned.

BACKGROUND OF THE INVENTION

1. Field of the Invention

The present invention is directed to apparatus and methods for maintaining computer software objects, and in particular is directed to a system based on object-oriented concepts using objects to represent system components and processes to be applied to those components.

2. Background and Prior Art

Software systems are constructed by creating a number of source code programs that are compiled and linked together to form an executable system. Software maintenance is the process of changing and adapting software to correct errors, or to enhance or change function. Software maintenance includes assuring that the executable software system (the execution version) contains all modifications that have been made to the component source programs. Execution version currency can be assured by recompiling and relinking all components of a software system each time one of the source programs is changed. However as the size of software systems has grown this technique becomes increasingly impractical.

Large software systems, such as operating systems software, and significant application programs, may be comprised of hundreds, thousands, or tens of thousands of separate source code programs. These source code programs are interrelated in a manner specified by the software system architecture designer. The interrelationship of the pieces of a software system can be represented as a hierarchical dependency graph. For example, in FIG. 1, the software system called "topone" is based upon three components, first.o, second.o, and third.o. Each of these, in turn, is dependent upon other programs, e.g. first.o is dependent upon first.c and first.h.

The dependency network for a software system typically identifies source program modules and intermediate components which are eventually assembled to create the finished software system. The generation of intermediate modules and the final system product is carried out by defined executable processes. The most frequently employed function is compilation, which transforms a source code program into an object code module containing machine language instructions necessary to carry out the steps defined in the source code. For example, the object module in FIG. 1 entitled first.o is created by compiling first.c together with first.h. (This example is based on programs coded in the C language, however, the principles are extensible to any compiled or interpreted language such as FORTRAN, PASCAL, ADA, or to assembly language.) The second frequently used process is the binding or link editing of object code files to form an executable module. The binding step includes the process necessary to interrelate object code so that references to variables, memory locations, and other factors are fully resolved so the resulting module can be loaded into a computer system and executed.

It is desirable in large software systems to perform compilation, binding, and other processes only to the extent required by changes to the source programs or to the software architecture definition defining the relationships between the programs. An attempt to manually perform only the necessary processes is subject to error and omission as the size of software systems grow. Automated tools for software maintenance have been developed to automatically determine the necessary changes and execute the required processes. One such tool is the "make" utility found in UNIX-based systems (UNIX is a trademark of UNIX Systems Laboratories).

Make uses an acyclic dependency graph specified in a computer file (known as a Makefile). Each node in the graph has a Make rule which is executed to produce a new version of the parent node if any child node has changed.

The Make utility, while capable of performing software maintenance, suffers from a lack of flexibility and difficulty of use. A large software system would require the specification of a large number of rules. The dependencies and interrelationships of the modules in a Make file is implicit rather than explicit leading to difficulties in interpretation and checking of the files. This leads to difficulties in maintaining the Make file when changes are made to the software architecture and interrelationship.

A discussion of several other techniques and proposed alternatives is provided in U.S. Pat. No. 4,558,413 to Schmidt et al. The Schmidt et al. system is designed to assemble a software system based upon source programs located in a series of workstation on a local area network. The Schmidt et al. system provides an extension to the Make utility which is claimed to provide more efficient management of large software products in a distributed environment. Schmidt et al., however, still require the specification of the complete architecture (system model) in a descriptor file.

Object-oriented software systems and object-oriented programming languages are being increasingly applied to the solution of large system software problems. Object-oriented approaches are directed to the subdivision of a problem to smaller, more easily managed pieces. Object-oriented languages and systems encourage programming and development in terms of "objects". Objects implement encapsulation by providing a single definition of the data and processes (known as methods) necessary to manage that object.

A second feature of object-oriented languages systems is the notion of inheritance. Inheritance allows one object to "inherit" or use the data or methods from another object. In this way, new, more specific objects can be defined by defining only the variances from a more general object definition.

Encapsulation of objects requires that object data be manipulated or viewed by the use of one of the object methods. Each object is provided a set of operations providing a visible interface to other objects. Communication between objects is accomplished by message passing where messages conforming to the visible interface specification are accepted and processed by that interface. A message passed to an object is analyzed by the object which itself selects a method by which it will react to that message.

Object-oriented concepts allow significant reusability of objects through the concept of instantiation. Instantiation allows a copy or instance of an object to be created from either a generic object description or another object using the principles of inheritance. The particular instance of the object has its own data and is permitted to override particular data in the generic object definition.

Inheritance allows an object instance to benefit from hidden data or methods in one or more superior objects. An object which inherits data or methods for more than one object is said to have multiple inheritance. Encapsulation of an object can be shown as in FIG. 2. Here an object designated 100 contains the data description 110 and functions 112 and 114. The object reacts in response to message 116 which causes a selection of one of the methods 112 or 114 for execution.

FIG. 3 illustrates the concept of multiple inheritance. Two objects A and B can be defined at 120, 122 respectively. Object C 124 is shown as inheriting the data and functions from each of the objects A and B and can have its own additional data and methods. Object C is said to be multiply dependent on objects A and B.

The object-oriented approach provides an important way to subdivide a large problem such as large software system maintenance. The concepts of encapsulation and inheritance provide a powerful tool for solving such large problems.

SUMMARY OF THE INVENTION

The present invention is directed to applying object-oriented techniques to the solution of large software maintenance problems. Software systems can be represented as objects which are in turn comprised of a plurality of other objects which, at the lowest level, represent physical source program files. In addition, the processes to be applied to the software objects can themselves be defined as methods within the objects. The application of processes to particular source files can be accomplished using a message passing scheme. To control the processing, messages are themselves created as objects having attributes to control the application of processes to system objects. These enhanced messages are known as events in the present system. The present invention includes an object dependency interpreter that analyzes object relationships and assures that events are routed as required by those relationships.

Therefore, the present invention is directed at solving the technical problem of maintaining large software systems comprised of a large number of software components.

BRIEF DESCRIPTION OF THE DRAWINGS

The preferred embodiment of the present invention will be described with reference to the following figures.

DETAILED DESCRIPTION OF THE PREFERRED EMBODIMENT

The present invention provides a system and method for maintaining software systems based upon defined software objects and events. The system provides an ability to define software objects and events, to create data structures representing the objects, and to interpretatively analyze object dependencies and structures to cause event processes to be applied to software objects as necessary to generate the final software system.

Figure 1:
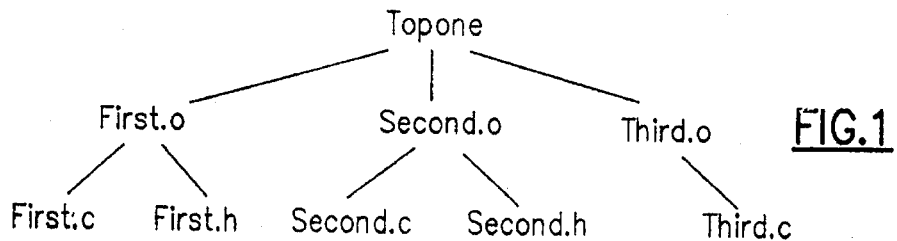
FIG. 1 is a dependency network showing an example of software component dependencies.
Figure 2:
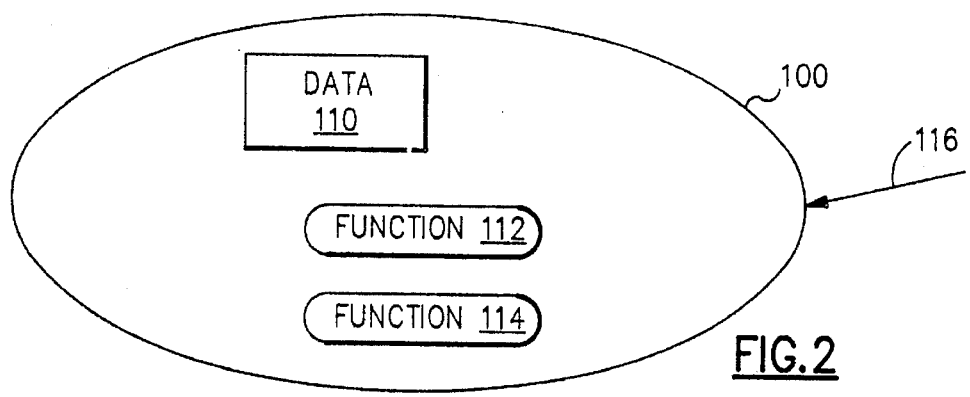
FIG. 2 is a schematic diagram of the component object and associated message.
Figure 4:
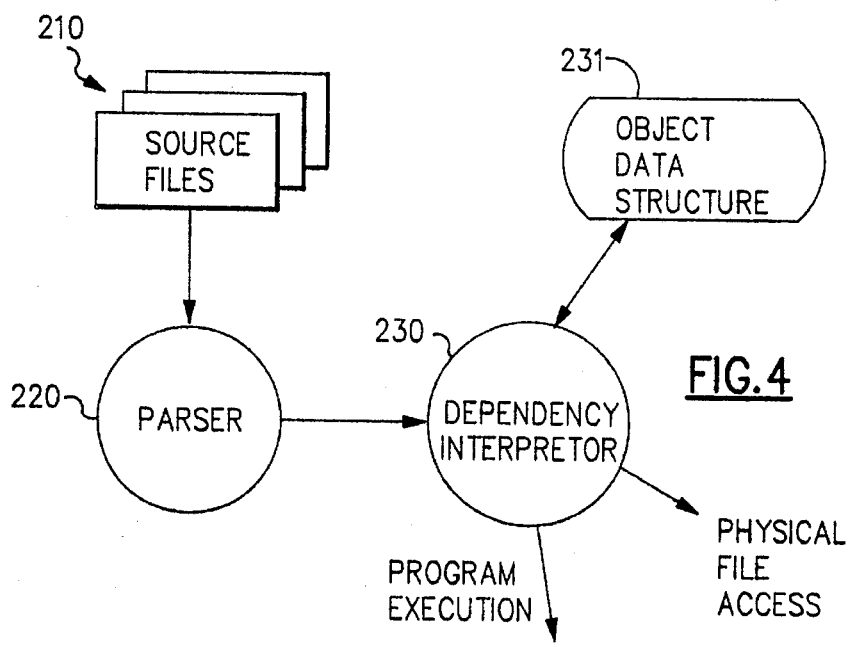
FIG. 4 is a block diagram showing the major components of the present system.
Figure 3:
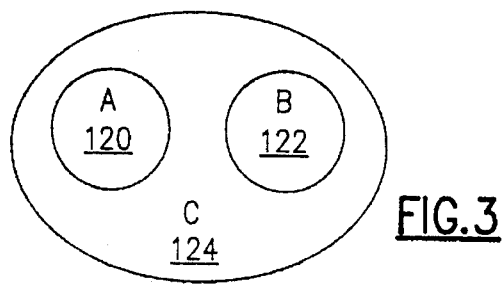
FIG. 3 is a schematic representation of object inheritance.

An overview of the system according to the present invention is shown in FIG. 4. Source files 210 contain the definitions of objects and events. Object and event definitions, in the preferred embodiment, are created as a series of text files with descriptors providing for the definition of object attributes and methods. The present invention, however, is not limited to the use of text based source files and is equally applicable to object definition files generated through a graphical interface or similar techniques. A software object, in the preferred embodiment, includes an object descriptor giving a name to the object and one or more attributes. Object attributes can include assignment of a value to a variable, the specification of object dependencies, the association of an event with an object method, or the definition of the process statements comprising an object method. Of particular importance to the present invention is the provision of a dependency list. A dependency list attribute specifies the objects on which the current object depends. For example, an object code object may be dependent upon one or more source code objects or library objects.

An object method defines the executable statements which must be processed to create the current software object. The method specifies what must be done with dependent objects and variables in order to create the present object. Thus, in the above example, the method for creating an object code object may involve the compilation of dependent source code files. The methods may be generalized to be able to recognize different types of source code files and apply the appropriate compiler or compiler options as a result of that recognition.

Generic objects may be defined for common situations. For example, the creation of an object file for a C language source file requires common compilation steps. A generic object can be defined for any C object code file specifying the necessary object methods. When the system needs to use a generic object, the object is instantiated for the particular object name and attributes are overridden to supply object dependencies, if necessary. Where a convention is followed such that the object code file and the source code file have the same name (e.g. x1.o and x1.c) no attribute replacement is required.

The source files also contain object definitions for events. As discussed above, events define the processes to be applied to the software objects. Event names correspond to method names and serve as messages to cause the objects to perform the necessary function. Event definitions according to the present invention include the provision of event conditions and prerequisite events to control the software maintenance process. Event conditions specify software object states that must be satisfied before the event is delivered to a software object. In the preferred embodiment, the conditions include: no condition, meaning that no object condition must be met; out of date, meaning that the software object must be out of date with respect to its dependencies; object exists, meaning that the object must be found in the file system; no object exists; and object built, meaning that the object was created by the application of an object method (as opposed to being entered by a human operator).

Prerequisite events specify any events that must be delivered to an object before this event may be delivered.

In the preferred embodiment, event objects are provided with an additional precondition and post-condition which allow testing and error detection if the application of an event to a software object does not create the expected result. Thus, for example, the execution of a compile process for a software object should result in the condition that the object was built by that process. If a post-condition test reveals that the object is not in that condition, an error has occurred and the system should notify the operator.

The present invention next includes a parser 220 which parses the source files containing object definitions and event definitions into an intermediate "object assembly" language. The object assembly intermediate language provides a simplified form of object description that can be used to build object data structures in memory. Object assembly, in the preferred embodiment, is a series of one-byte operation codes that define the object, its attributes, and conditions. Provision of a standard intermediate language allows the present invention to work with source files parsed by parser 220 or allows the definition of graphical input or different format source files which can be transformed into object assembly language by the application of an appropriate parser.

The next component of the present invention is object dependency interpreter engine 230. The object dependency interpreter controls the operation of the system by managing the passing of events to objects and causing the appropriate methods to be executed. The object dependency interpreter is a recursive process that evaluates each software object to determine its dependencies, and ensures that all lower level dependency conditions have been satisfied before the present object is evaluated. The object dependency interpreter also is responsible for instantiating specific instances of generic objects and for managing the inheritance properties between objects.

The preferred embodiment uses inheritance to minimize the number of definitions required in the software object definition section. A series of superclasses are defined that contain generic objects with generic dependencies and the methods required to generate that object. These generic objects include the data and methods required to compile different language source programs and to bind the resulting object modules together.

The present invention makes use of shared memory and mapped memory files to increase the speed object analysis and access. The object dependency interpreter 230 uses object assembly data to build an object data structure for each of the objects that find the source files 210. This data structure is placed in the mapped memory area of a UNIX-based system. The mapped memory area provides the ability to save the memory area to a permanent disk file 231 and to restore that file to the memory at the same memory address. The ability to restore the data at the same memory address simplifies the process of saving and restoring the file. The object dependency interpreter can continue to work with the object data file in the mapped memory unless source files 210 have been modified. This eliminates the need to operate parser 220 and for object dependency interpreter 230 to build the object data on each location.

When interpreting event conditions, the object dependency interpreter must be able to determine the date of last update for source program files. In many prior art systems, this date was checked each time the source program was referenced during software maintenance. This multiple date checking greatly increased the overhead and slowed processing time in such software maintenance systems. In a large software environment containing a large file system and potential of shadowed filed trees, such repetitive date checking is undesirable. The present invention removes this limitation by checking the file status only once displaying the results in memory for any other reference.

Operation

The software maintenance system according to the present invention operates as follows.

A software system architect builds object and event source files 210 using a text editor, a graphic editor, or other known device. The object definitions specify the system software architecture by specifying the dependencies for each module. Event objects are define, including defining all processes to be applied to software objects and conditions for their application.

Figure 5:
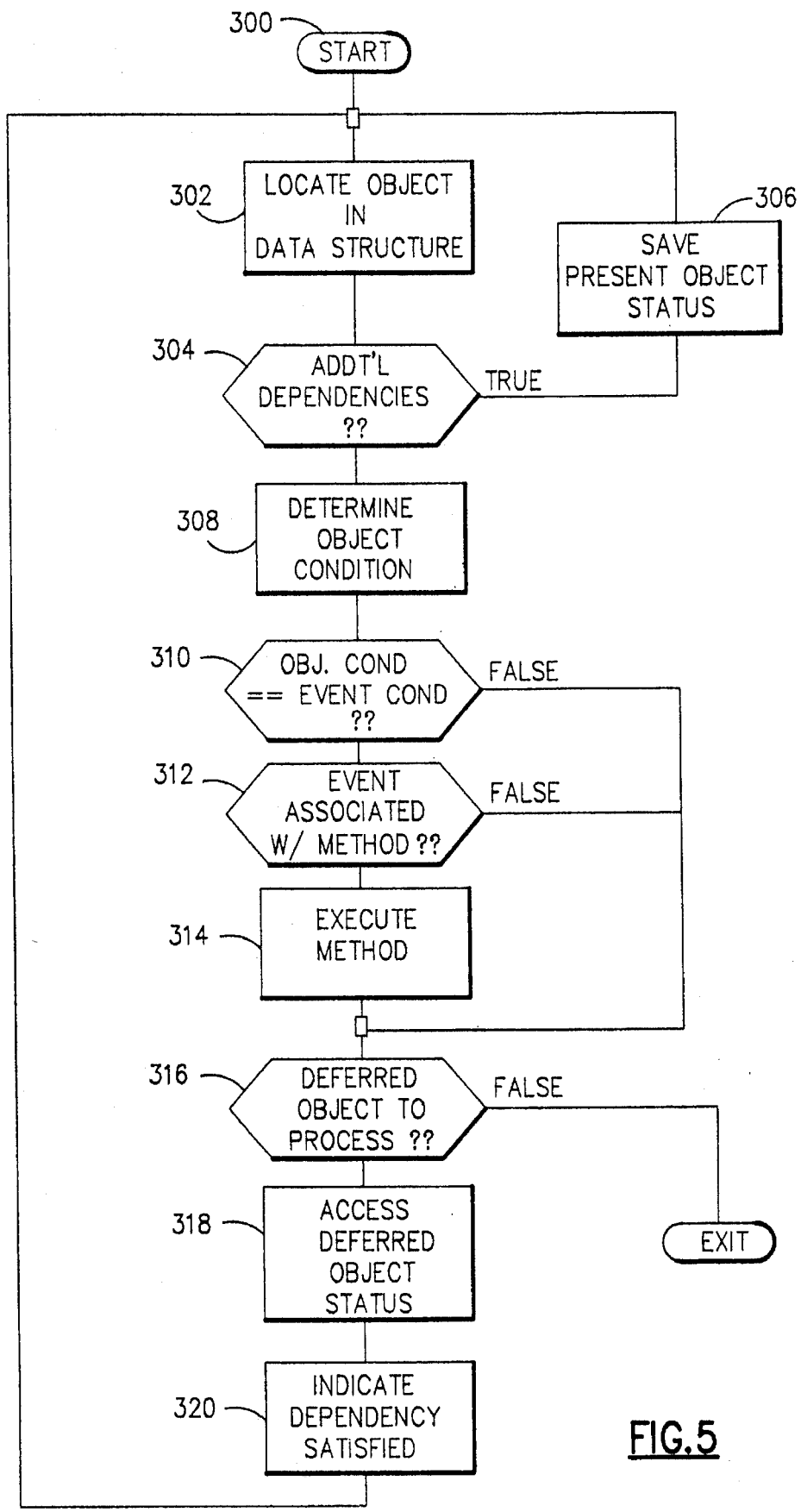
FIG. 5 is a flow chart showing the processing steps of the object dependency interpreter according to the present invention.

After making changes to a source program, a programmer or operator may wish to use the software maintenance system to create an updated executable version of the system. The operator invokes the software maintenance system and supplies an initial event and an object to which the event is to be applied. It is possible in the preferred embodiment to specify a default event and default initial object with the object and event descriptions. The system first determines whether the object data structure 231 is out of date with respect to the source files 210. If so, parser 220 is activated to parse the source files and pass the resulting object assembly to the object dependency interpreter. The object dependency interpreter is accessed and first builds the revised object data structure. In the preferred embodiment this structure is built in mapped memory. Operation will be described with reference to flow charts shown in FIG. 5. The object dependency interpreter 230 will first attempt to locate the specified object in the object data structure, step 302. Once the object has been located, the interpreter tests to determine whether dependencies exist for that object (304). If dependencies exist, the current object status is saved, for example in a stack (306), and the first dependent object is located, step 302. The locate object step 302 and test for dependencies step 304 are recursively executed until an object with no dependencies is located. This object represents the lowest level or lead node in the object dependency hierarchy.

The interpreter next determines the condition of the object (308), for example, whether it is built, exists, or is out of date. The interpreter next tests this object condition against the condition specified in the event descriptor to determine a match (310). If the conditions do not match the event is not delivered to this object and processing continues by attempting to locate the parent object and to continue processing at step 316.

If the object condition matches the event condition, the event is to be delivered to the object. Interpreter 230 must determine whether the object definition associates a method with the specified event (312). If no method is associated with the event, the processing continues at step 316. If the method is associated, that method is executed at 314.

Step 316 determines whether delivery of the process to a higher level object has been deferred. If so, this object is once again accessed (e.g. removed from the stack) and the test for additional dependencies continues. Execution proceeds recursively in this manner until all dependencies for the highest level object have been satisfied. Finally, the object condition for the highest level event is tested and that highest level object is processed according to the same logic. Since no more objects exist at this point the interpreter exits.

Extensions to the preferred embodiment include the ability to build instances of generic objects. This would occur following step 302, when the system, if failing to locate the specific object in the data structure would seek to match the object name with the generic object defined in the data structure and if found, the specific object would be instantiated based upon the generic object. Similarly, when event associations are tested at step 312, the interpreter will search the object for the necessary method, and if not found will check all superclass objects from which the current object may inherit a method or attribute.

The object dependency interpreter also has the ability to detect prerequisite events or pre-events defined in the event definition. When the object dependency interpreter detects a pre-event, processing of the current event is suspended and any prerequisite event is first processed. Processing of pre-events is also recursive in that any pre-events for identified pre-events are processed before that event. Processing of each of these events occurs according to the identified steps.

The preferred embodiment of the present invention has been described above in terms of specific steps and implementations. It will be recognized by those skilled in the art that alternative implementations are possible which will result in functionally equivalent processing. It is therefore intended that the scope of the present invention be limited only by the appended claims.

The present invention provides significant advantages over the prior art. The use of object structures and object dependency interpreter simplifies both the specification of the objects, events, and dependencies, and provides for rapid processing necessary to maintain the software system.

We claim:

1. An information processing system for managing message passing between objects, said system comprising:
   (a) storage means for storing objects and events, each of said objects having one or more object conditions, one or mope attributes, and one or more methods associated therewith, each of said methods having an identifier and specifying operations to be performed by said system, said attributes including a list of zero, one or more dependency objects on which the object depends, each of said events having one or more event conditions associated therewith;
   (b) initialization means for starting said system, said initialization means determining an initial object and an initial event;
   (c) dependency interpreter means for recursively identifying target objects on which said initial object and identified target objects depends based on said dependency objects, and for delivering said initial event to all of said identified target objects before delivering said event to said initial object; and
   (d) delivery means for delivering said initial event to said target objects, said delivery means including:
      (1) means for testing the object conditions associated with said target objects to determine whether the event conditions associated with said initial event are satisfied;
      (2) means for testing the methods associated with said target objects, if said event conditions are satisfied, to determine whether a method for the event is associated for that object; and
      (3) processing means for executing said method if said means for testing locates a method for said event.

2. The system of claim 1 further comprising:
   source object storage means for storing source code descriptions of said objects;
   event storage means for storing source code descriptions of said events;
   parsing means for transforming said object and event source code descriptions into an intermediate language representation; and
   data structure means for building said objects and events into a data structure in said storage means.

3. The system of claim 2 wherein said object definitions include generic objects having attributes and methods and wherein said system further comprises:
   object instantiation means for identifying a generic object similar to said initial or target object and for generating an instance of said generic object with properties of said initial or target object.

4. The system of claim 3 wherein said instance inherits attributes and methods from said generic object.

5. A system for software maintenance, said system creating a current version of a software object from a plurality of software source files, said system comprising:
   (a) event storage means for storing events required to maintain said software object, each of said events having an event identifier and one or more event conditions;
   (b) object storage means for storing object definitions defining objects, each of said objects having an object identifier, one or more attributes, one or more object conditions, and one or more methods describing operations to be performed by said system, said attributes including at least one dependency object on which the object depends, wherein said dependency objects represent a software object comprised of zero, one or more dependent objects, or is a reference to a source file;
   (c) operator interaction means for identifying an operator selected initial object and initial event;
   (d) dependency interpreter means for recursively identifying target objects on which said initial object and its dependency objects depend; and
   (e) delivery means for delivering said initial event to said target objects, said delivery means including:
      (1) means for testing said target object conditions against said event conditions;
      (2) means for testing said target object methods to determine whether said target object has an associated method matching said event, if said event conditions are satisfied; and
      (3) processing means for processing said associated method if an associated event is identified.

6. The system of claim 5 wherein said event storage means and said object storage means comprise system random access memory beginning at a first address and wherein said system further comprises:
   non-volatile system storage means for copying data in said event storage means and said object storage means to said non-volatile system storage; and
   means for copying data from said non-volatile storage to said event storage and said object storage so that said first address remains the same.

7. The system of claim 6 further comprising:
   event data entry means for entering event definitions; and
   object data entry means for entering object definitions.

8. The system of claim 7 wherein said event data entry means and said object data entry means comprise a text entry system; and wherein said system further comprises:
   parsing means for transforming text event and object data into an intermediate language; and
   data structure generation means for transforming said intermediate language into said object and event data structure in said random access memory.

9. The system of claim 8 wherein said object definitions include generic objects having attributes and methods and wherein said system further comprises:

object instantiation means for identifying a generic object similar to said initial or target object and for generating an instance of said generic object with properties of said initial or target object.

10. The system of claim 9 wherein said instance inherits attributes and methods from said generic object.

11. The system of claim 5 wherein said events further include prerequisite events that must be applied to objects before said event.

12. The system of claim 5 wherein said event conditions include a delivery condition, a pre-application condition and a post-application condition, wherein failure of said pre-application or post-application conditions causes an error message to be generated.

13. The system of claim 12 wherein the event conditions are one of: object exists, object does not exist, built, out of date, or no condition.

14. A computer implemented method for managing software system versions, where each software version is computer executable code generated from a plurality of computer stored source code modules and object code modules, the method comprising the steps of:

(a) initially, in response to user input:
  (1) specifying each source code object in the software system, wherein each source code object includes a list of source code objects on which the object depends and procedural methods describing the procedure for generating the source code object;
  (2) specifying a plurality of events to be applied to the source code objects, the events including event conditions that must be satisfied before the event is applied to the source code object;
  (3) providing an initial object and an initial event to be applied to the initial object;

(b) for said initial event, automatically:
  (1) recursively testing for object dependencies in the initial object dependencies in the initial object and associated objects on which it depends;
  (2) testing the source code object description to determine whether a procedural method has been associated with the event, if the object conditions satisfies the event condition;
  (3) applying the associated method to the object to generate a new version of the object, if a method is associated with the event; and
  (4) repeating steps (b) (1)–(b) (3) for all objects on which the object depends and the initial object until all have been processed.

15. The method of claim 14 further comprising the steps of:

entering computer readable source code files to specify the source objects and events;

parsing the computer readable source code files thereby transforming them to an intermediate language representation; and building an object data structure in computer storage from the intermediate language representation.

16. The method of claim 14 wherein the steps of specifying source code objects and events is performed by selecting representations from a graphical display and arranging those representations as required to specify the source code objects and events.

17. The method of claim 15 further comprising the steps of:

copying the object data structure to non-volatile storage; and skipping the parsing and building steps and instead copying the object data structure from non-volatile storage to computer storage if the source code files have not changed between initiations of the system.

18. The method of claim 17 wherein the initial object and initial event are specified by default in the source code object specification and event specification.

19. The system of claim 1 wherein said dependency interpreter means and said delivery means process each of said events beginning with said initial event.

20. The system of claim 5 wherein said dependency interpreter means and said delivery means process each of said events beginning with said initial event.

21. The method of claim 14 wherein steps (b) (1)–(b) (4) are performed for each of said events beginning with said initial event.

* * * * *